July 1, 1930.  J. B. RUATTI  1,769,074
DITCH DIGGER
Filed Feb. 11, 1926   6 Sheets-Sheet 1

Inventor
Joseph B. Ruatti
by Hazard and Miller
Attorneys

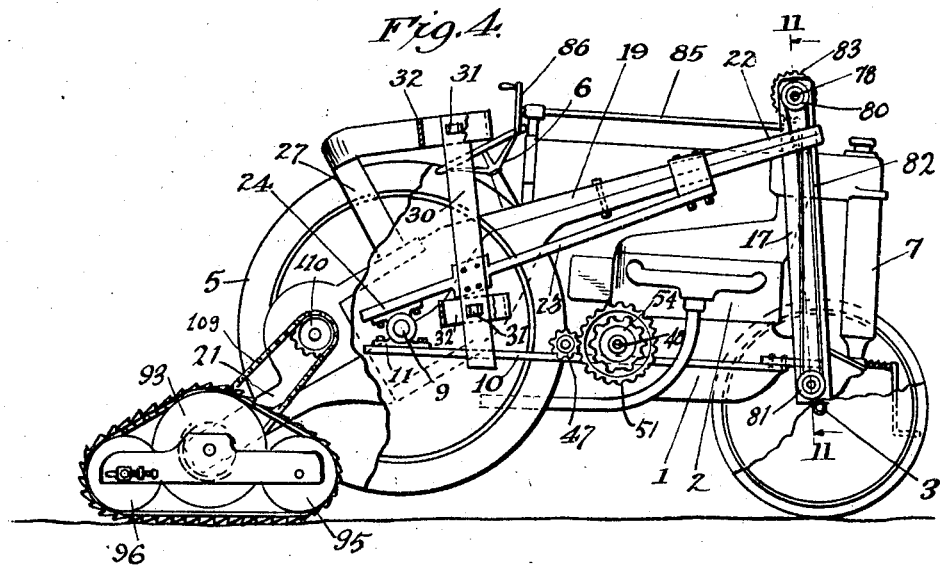
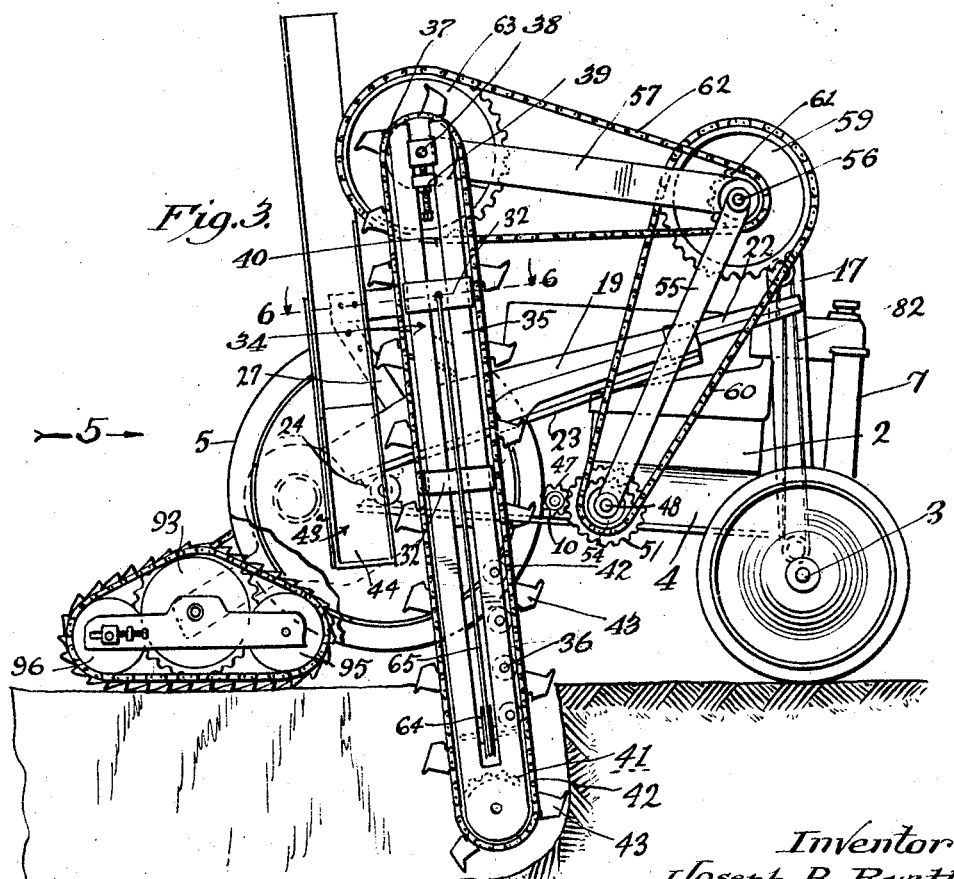

July 1, 1930.   J. B. RUATTI   1,769,074
DITCH DIGGER
Filed Feb. 11, 1926   6 Sheets-Sheet 3
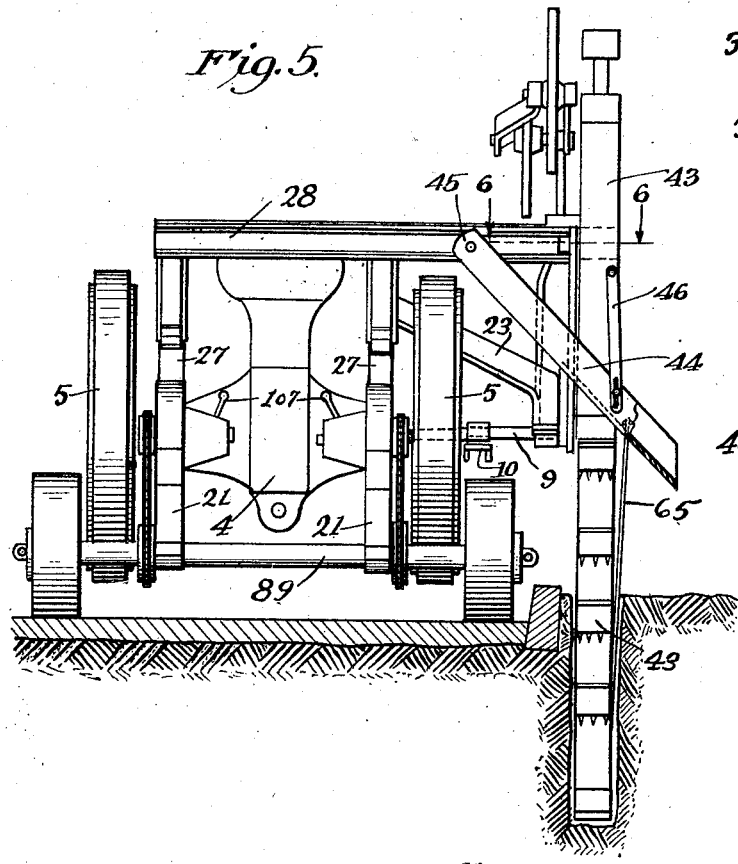
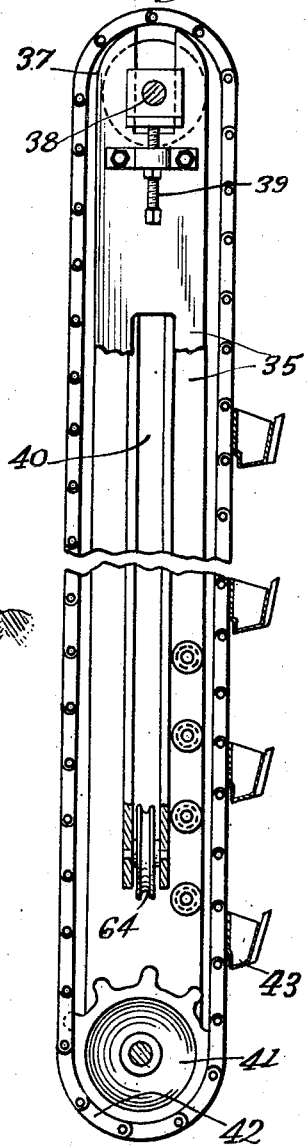
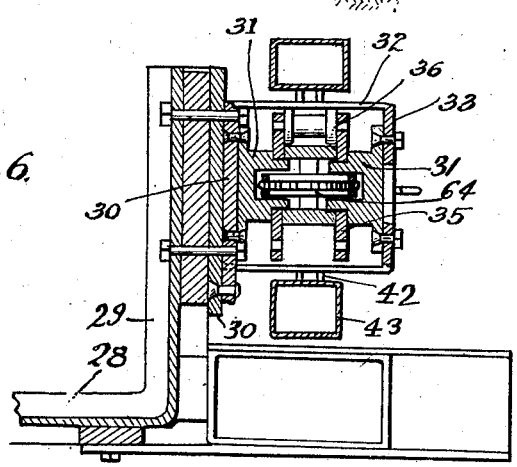
Inventor:
Joseph B. Ruatti
by Hazard and Miller
Attorneys

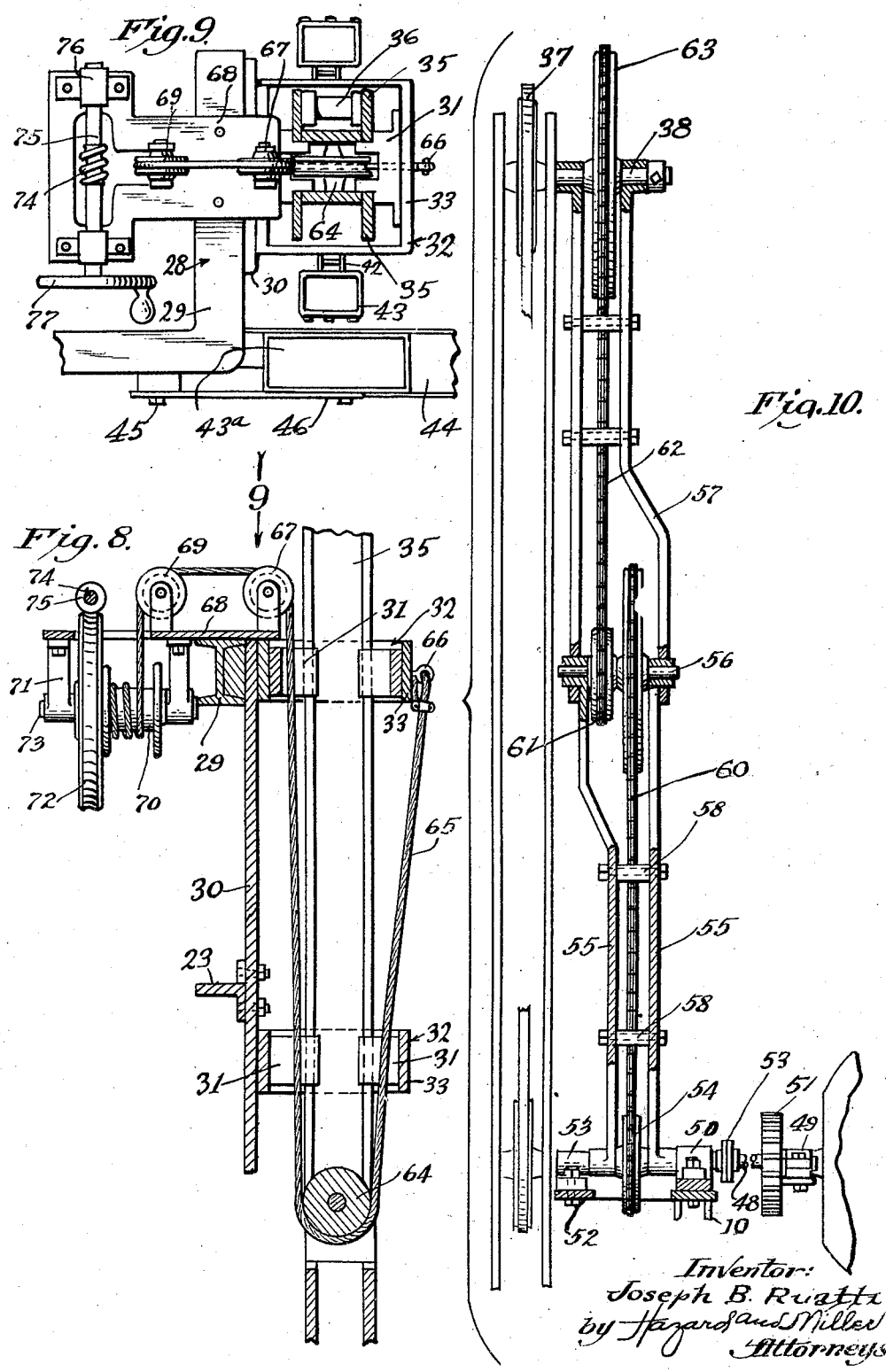

July 1, 1930. J. B. RUATTI 1,769,074
DITCH DIGGER
Filed Feb. 11, 1926 6 Sheets-Sheet 5
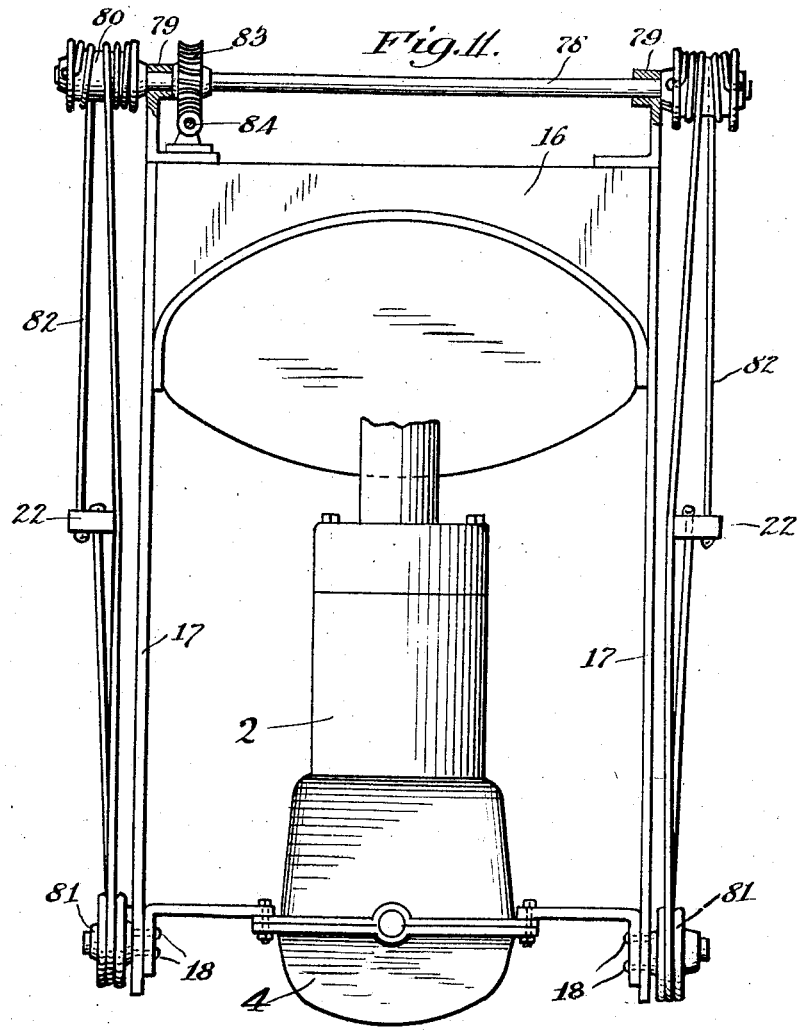
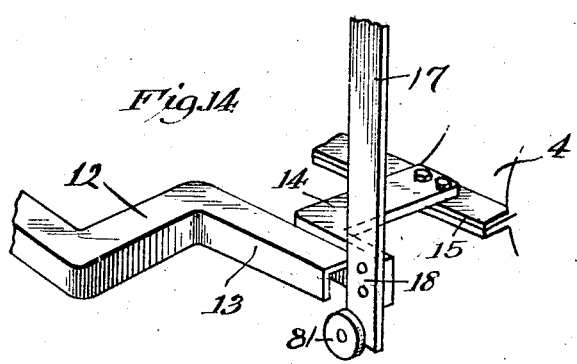
Inventor:
Joseph B. Ruatti
by Hazard and Miller
Attorneys

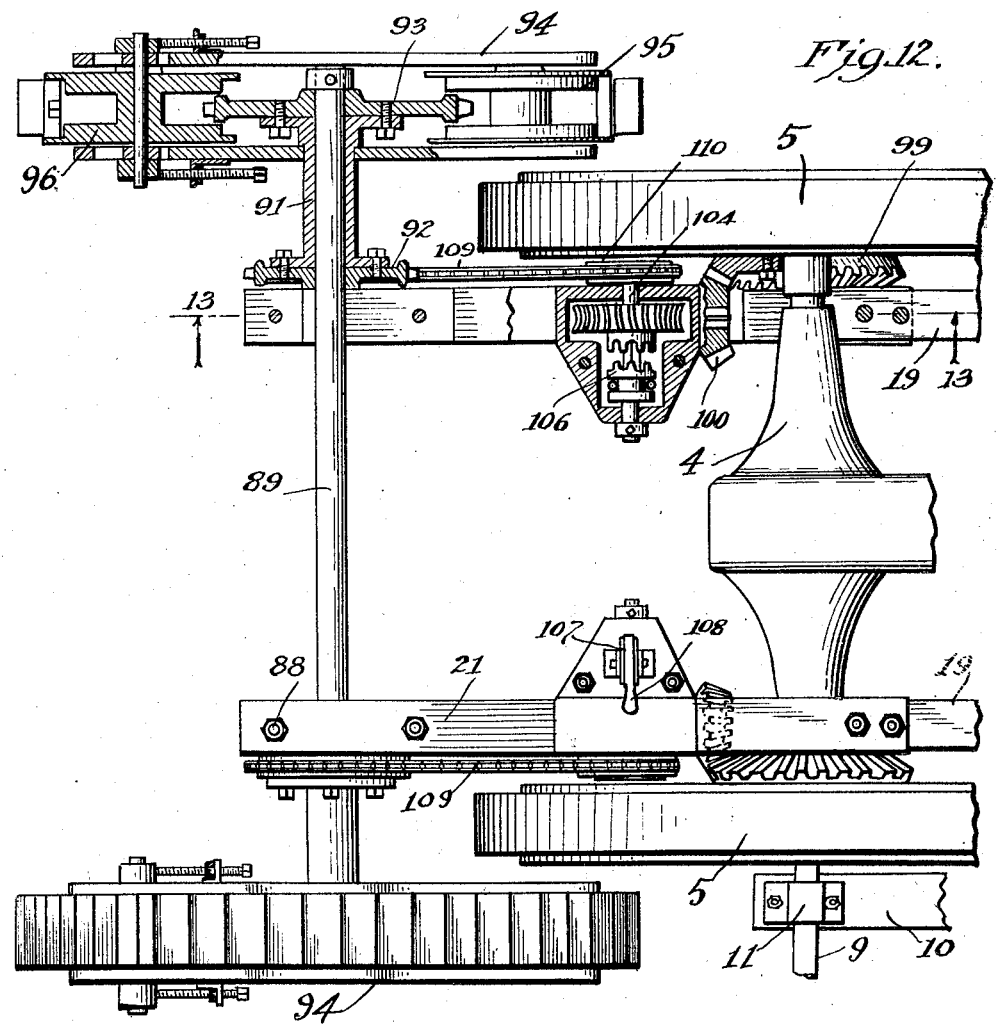
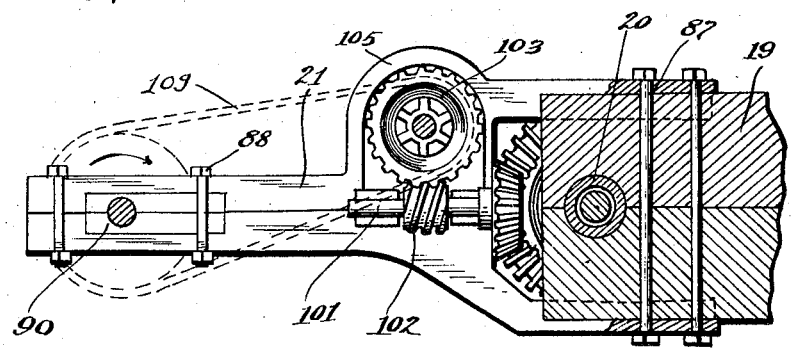

Patented July 1, 1930

1,769,074

UNITED STATES PATENT OFFICE

JOSEPH B. RUATTI, OF LOS ANGELES, CALIFORNIA, ASSIGNOR OF ONE-HALF TO BENJAMIN TORNAVACCA, OF LOS ANGELES, CALIFORNIA

DITCH DIGGER

Application filed February 11, 1926. Serial No. 87,557.

My invention is a ditch digger of the endless bucket type, adapted to be carried by a tractor to be moved lengthwise of the ditch, the ditch being dug at one side of the tractor.

An object of my invention is to construct a framework for supporting a ditch digger, the framework being attachable to a standard type of tractor or to somewhat similar tractors.

A further object of my invention is to mount a ditch digger of the endless bucket type in the framework so that the digger may be raised and lowered and be driven in the digging operation by the engine of the tractor.

A further object of my invention is a slow speed drive for the tractor which may be brought into operation when the digger is working in order to slow down the longitudinal movement.

An additional object of the slow speed drive is to have an increased bearing surface for the tractor driving mechanism and to elevate the ordinary tractor driving wheels when the slow speed drive is in operation.

Considered generally, an object of my invention of the combined features is to mount a ditch digger on a tractor so that the digger can readily be moved from place to place by the ordinary driving power of the tractor and the slow speed mechanism would be raised from the ground when the tractor wheels are in engagement therewith.

A specific object of my invention is to form the slow speed mechanism with a quick detachable connection to the frame carrying the digger so that these parts may be readily bodily removed.

In constructing the digger of my invention I preferably make use of a standard type of tractor now on the market and by means of a suitable frame attached thereto I support a ditch digger of the endless belt type at one side of the tractor. A substantial lever arm is pivotally swung on the rear axle housing of the tractor and is adapted to raise and lower the digging mechanism. A slow speed drive in the form of an endless track drive mechanism is mounted on the rear end of the lever and brought into engagement with the ground on the swinging of the lever up at the forward end and downwardly at the rearward end of the tractor. This swinging operation is manually done through a power reducing mechanism.

At the same time that the endless track mechanism is lowered to the ground and raises the tractor wheels, the endless bucket digger is tilted into a suitable digging position. This digger may then be raised and lowered by manually operated mechanism, this having power reducing gearing.

The endless track slow speed drive is driven through mechanism connected to the rear wheels of the tractor and being elevated to rotate freely through the ordinary engine drive, the transmission to the endless track device having speed reducing gearing. The excavator buckets are driven by a power transmission from a power shaft permanently mounted as an integral part of the tractor.

My invention in its various aspects and the details thereof will be more readily understood from the following description and drawings, in which;

Fig. 3 is a view similar to Fig. 2, with the rear wheels of the tractor elevated, the endless track drive being in operation and the digging buckets in operation digging a ditch.

Fig. 4 is a partial side elevation with the digger mechanism completely removed to illustrate the framing.

Fig. 5 is a rear elevation taken in the direction of the arrow 5 of Fig. 3.

Fig. 6 is a detail horizontal section on the line 6—6 through the bucket digger.

Fig. 7 is a detail side view of the bucket digger illustrating in part the raising and lowering mechanism therefor.

Fig. 8 is a vertical transverse section on the line 8—8 of Fig. 2, taken in the direction of the arrows, showing part of the lifting mechanism of the digger.

Fig. 9 is a plan view of the detail of Fig. 8 in the direction of the arrow 9.

Fig. 10 is a developed view in the direction of the arrow 10 of Fig. 2, showing parts in section of the drive mechanism for the bucket excavator.

Fig. 11 is a transverse vertical section slightly forward of the line 11—11 of Fig. 4, to indicate the operating levers and power drive for raising and lowering the tractor wheels; these levers being indicated in their position when the tractor wheels are on the ground.

Fig. 12 is a plan in partial section of the slow speed endless track drive as if taken in the direction of the arrow 12 of Fig. 2.

Fig. 13 is a detail longitudinal section on the line 13—13 of Fig. 12, in the direction of the arrows.

Fig. 14 is a perspective detail showing the attachment of one of the fixed frame members to the engine casing.

Figures 1, 2:
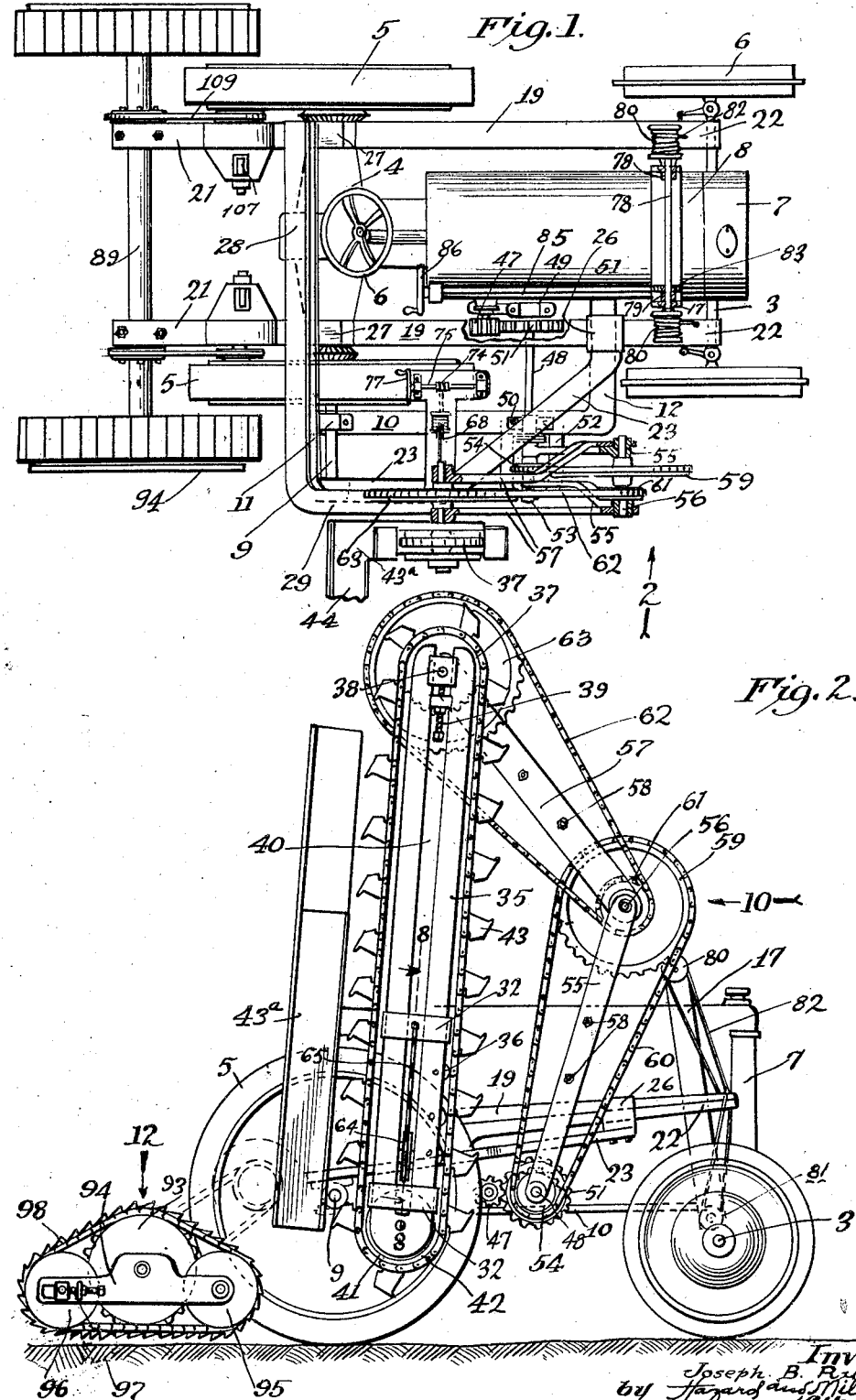
Figure 1 is a plan view of my digger attached to a standard tractor, showing the slow speed mechanism.
Fig. 2 is a side elevation in the direction of the arrow 2 of Fig. 1, with the tractor wheels on the ground and the digger and endless track drive elevated.

The tractor with which my digging mechanism and slow speed drive is shown attached, is shown with its essential characteristics, these being substantially as follows:

The particular tractor illustrated is known in the trade as the Fordson tractor, having a frame 1 forming the engine base with the engine 2 mounted thereon, a front axle 3, a rear axle housing 4 having rear driving wheels 5, the steering wheels 6 being mounted on the front axle.

The radiator 7 has a rearwardly extending water tank 8 which forms a support for part of the mechanism and is hereunder mentioned. It will be understood that the control mechanism for the tractor may be left substantially in the same condition in which the tractor is sold.

The framing for attaching the digger mechanism is constructed substantially as follows, having reference particularly to Figs. 1 to 5:

A stub axle 9 is attached to one of the driving wheels or the driving wheel axles and extends outwardly therefrom in alinement with such axle. This forms a support for a stationary lower bar 10 which has the journal 11 for the shaft. This bar extends forwardly to a position adjacent the front wheels and then has an inward extension 12 and a forward extension 13 as shown particularly in Figs. 1 and 14; this forward extension being attached to a brace 14 which is rigidly bolted to the flange 15 of the engine casing.

A saddle 16, preferably made of wood is positioned over the water tank 8 and has a pair of depending straps 17; these straps being bolted to the forward end of the brace 14 as indicated at 18. The fixed bar 12 is rigidly secured at its front and rear ends.

The tilting frame for supporting the conveyor is constructed substantially as follows:

A pair of lifting levers 19 each formed in upper and lower sections are swivelly mounted on the rear axle housing as indicated particularly by the numeral 20 in Fig. 13. These levers have a rearward extension 21 for supporting the slow speed endless track mechanism as hereunder described and a forward end 22 to connect with the operating mechanism for such levers.

An upper bar 23 is supported by a journal 24 on the outer end of the stub shaft 9. This outer bar extends forward a certain distance parallel to the bar 10 and then has an inward bend 25 being connected at its forward end 26 to the lever arm 19 on one side of the machine, this being shown on the right hand side looking forward. Such bar therefore swivels with the levers 19.

A relatively fixed frame mounted to oscillate comprises posts 27 extending upwardly from the levers 19 and having a cross beam 28, extends outwardly beyond the side of the tractor. This beam has a forward extension 29 to which is connected a strut 30, such strut being attached to the bar 23. This forms a support for the digging mechanism hereunder described.

It will thus be seen that when the beam oscillates the frame composed of the elements 27, 28, 29 and 30 also oscillates thereby tilting the digging device from the position shown in Fig. 2 to that shown in Fig. 3.

The mounting of the diggers is substantially as follows, being illustrated particularly in Figs. 1 to 7:

The strut 30 has upper and lower guide lugs 31 and upper and lower yokes 32 connected on the outside by a cross bar 33. The frame 34 for the diggers comprises a pair of channels 35 having a series of rollers 36 mounted therein and carrying a driving sprocket 37 mounted on a drive shaft 38, this shaft being adjustably secured as indicated, by the adjustment screw 39 in the slot 40 between the two channels. A sprocket 41 is positioned at the lower end of the channels and the bucket chains 42 having buckets 43ª thereon pass over the sprockets 37 and 41.

A discharge chute 43 is secured at its upper end to the I-beam 29 and a swivelling spout 44 extends across the lower end of the chute, this spout being pivoted at 45 to the I-beam 29. A latch 46 suspends the spout from the chute and allows it to be disengaged to hang downwardly when the digger is being transported.

The driving mechanism for the digger is constructed substantially as follows, having reference particularly to Figs. 1 to 4:

A pinion 47 is mounted on the end of a shaft which is part of the tractor and driven from the engine. A counter-shaft 48 having a journal 49 at one end on the frame of the engine and a journal 50 on the fixed lower bar 10, carries a gear 51 driven by the pinion 47. A frame 52 extends outwardly from the lower fixed bar 10 and has a journal 53 for the outer end of the shaft 48. A sprocket 54 is carried between the journals 50 and 53 and forms the initial gear in a flexible transmission. This transmission comprises the arms 55 formed in pairs and pivoting on the shaft 48 linked by a shaft 56 to upper arms 57, the arms 55 and 57 being formed of double bars as shown particularly in Fig. 10 spaced apart by braces 58. A large sprocket 59 is driven by the chain 60 from the sprocket 54 rotating the shaft 56 and thereby transmitting motion through the small sprocket 61 and the upper sprocket chain 62 to the drive sprocket 63 on the drive shaft 38 of the digger mechanism.

The manner of raising and lowering the bucket excavator is substantially as follows, being shown particularly in Figs. 6 to 9:

A transverse pulley 64 is mounted in the lower portion of the bucket frame between the channels 35 and has a cable 65 having one end secured at 66 to the upper guide lugs 31 roved over said pulley and leading upwardly to a pulley 67 mounted on a plate 68 secured to the upper flange of the I-beam 29, there being a second guide pulley 69 over which the rope is roved, the rope thence leading to the drum 70 journaled in brackets 71 depending from the plate 68.

The drum has a worm gear 72 connected thereto or keyed to the same shaft 73 on which the drum is mounted and a worm 74 on a worm shaft 75 mounted in journals 76 on the plate 68 is rotated by the hand wheel 77. Thus dependent on the direction of rotating the hand wheel the cable is wound in and out and therefore rises or allows the dropping of the excavating bucket frame and the buckets; this action causing the arms 55 and 57 to change their relative angle from that illustrated in Fig. 2, the non-working position to that of Fig. 3, one of the working positions.

The detail of the lever controlling mechanism for hoisting the driving wheels of the tractor above the ground and supporting the weight on the endless track slow speed drive and also tilting the excavator buckets is substantially as follows, being illustrated particularly in Figs. 1 to 4 and 11:

As above mentioned in the description, the saddle 16 has the straps 17 depending therefrom at both sides. A drum shaft 78 is mounted on journals 79 on the top of the saddle, this shaft having drums 80 keyed thereon and idler pulleys 81 are mounted on the lower ends of the straps 17. Cables 82 are roved up over the drum having several or more turns therearound and over the pulleys 81 being connected to the forward end 22 of the levers 19. A worm wheel 83 is mounted on the drum shaft 78 being driven by a worm 84 on a worm shaft 85 the shaft having a hand wheel 86 in a convenient position to the operator of the tractor.

By manipulation of the hand wheel 86 by rotating it either one way or the other the drum shaft 78 rotates in one direction or the other and hence winds the cable 82 in different directions, the cable thereby actuating the end 22 of the levers in opposite directions if desired. As the outer ends of the levers are raised up the rear end is depressed, the levers turning on the rear axle housing as above mentioned.

The construction of the endless track support for the rear end of the levers is substantially as follows, having reference particularly in Figs. 1 to 5 and 12 and 13:

The rearward extension 21 of the levers is formed with an upper and lower section secured by bolts 87 to the levers 19 and its outer end by bolts 88. A cross shaft 89 is mounted in journals 90 at the rear end of the extensions 21 and sleeve 91 are carried by the outer ends of the shaft, the sleeves being bolted to sprockets 92 at their inner end and to endless track sprockets 93 at their outer end. Side frame bars 94 are mounted on the sleeves 91 and the outer ends of the shaft 89. These bars have endless track wheels 95 and 96 mounted at opposite ends. The wheel 96 is adjustable by means of the screw and nut device 97 to give adjustment for the endless track tread 98 which extends over the endless track wheels 95 and 96 and is driven by the sprockets 93.

From the above description it will be seen that when the forward end of the levers are raised the rear extension 21 is depressed, the endless track tread coming in contact with the ground and hence lifting the rear wheels 5 of the tractor above the ground. This shifts the relative relation of the endless track device and the driving wheels from that shown in Fig. 2 to the position of Figs. 3 and 4.

A positive drive is communicated to the endless track treads in the following manner, as illustrated particularly in Figs. 12 and 13:

Bevelled gears 99 are rigidly bolted or otherwise secured to the tractor wheels 5 and mesh with bevelled pinions 100 which are mounted on a worm shaft 101 journaled in the extension 21 of the levers. A worm 102 on the worm shaft meshes with a worm gear 103 on the worm gear shaft 104; this being mounted in a gear casing 105 extending upwardly from the upper half of the rear extension 21. The worm is loosely rotatable on the shaft 104 and by the clutch 106 operated by a clutch lever 107 through the slot 108 in the gear casing 105 that may be clutched to the shaft to drive same. A pair of sprocket chains 109 transmit the motion from drive sprockets 110 on the ends of the shaft 104 to the sprockets 92 connected to the sleeves 91.

From the above construction it will be apparent that when the rear wheels of the tractor are jacked up as illustrated in Figs. 3 and 4, that such wheels may be driven at any desired speed by the tractor engine through its usual drive mechanism being controlled by the usual throttle and spark control and the rotation of the wheels will, through the gear trains above mentioned transmit rotary motion to the sprocket 93 in the endless track device, thereby driving the endless track treads. On account of the clutch 106 this mechanism can be thrown out of operation when desired.

There is also provided a bolted collar 53' on the shaft 48 by which said shaft may be entirely disconnected from the sprocket drive mechanism for the bucket excavator.

It is believed the general manner of using my invention is clear from the above description. It may be stated however, that the device may be utilized for digging ditches or for digging a hole or a series of holes, the excavator being elevated and the device moved between operations. By actuating the front steering wheels the ditch digger may form a curved ditch and it will be noted by reference to Fig. 5, that the excavator buckets may work in close to a curb or the like, the tractor being on the roadway.

I wish to direct attention to the demountable features by which if desired the ditch digging mechanism may be readily removed, it being only necessary to disconnect this from the supporting strut 30 and the guide lugs 31 and the yoke 32. However, in ordinary transportation by the power of the tractor the excavator may be elevated into the position shown in Fig. 2 and thereby easily moved.

Moreover, the slow speed endless track mechanism may be detached in a simple manner by removing the bolts 87 so that the whole mechanism connected with the endless track may be bodily removed. My combination of the ditch digger with the slow speed mechanism however, allows both to be elevated above the ground for transportation.

While I have illustrated my ditch digging mechanism and the slow speed device as being attached to a well known tractor, it will be understood that with the comparatively simple modifications necessary the construction could be adapted to many of the types of tractors now in general use or a special tractor could be built to accommodate my ditching machine with the slow speed mechanism to be utilized in ditching operations.

It will therefore be apparent that my ditch digger in its various features may be considerably altered in general construction and in specific details to adapt it to different types of tractors or to different purposes. Such changes would be within the spirit of my invention as set forth in the description, drawings and claims.

Having described my invention, what I claim is:

1. In a ditch digger, the combination of a tractor having a rear axle housing, a pair of levers pivotally mounted on the housing, extending forwardly thereof, a saddle mounted on the forward part of the tractor having downward depending straps, said straps being connected at their lower ends to the frame of the tractor, a drum shaft mounted on the saddle having drums on the end thereof, pulleys mounted on the lower ends of the straps, ropes roved over the drums and the pulleys, being connected to the forward ends of the levers, and a system of gearing for operating the drum shaft to wind the cables and hence move the levers.

2. In a ditch digger as claimed in claim 1, having in addition a slow speed supporting and driving mechanism connected to the rear end of the said levers, said mechanism being adapted on raising of the front ends of the levers and depressing of the rear ends to raise the axle housing and hence the tractor wheels above the ground.

3. In a ditch digger having a rear axle housing having driving wheels, a pair of levers pivotally mounted on the rear axle housing and extending forwardly and rearwardly therefrom, a slow speed supporting and driving mechanism having a wheel connected to each rearward extension, means to move the forward ends of the levers and depress the rear ends, thereby lifting the driving wheels above the ground and means operable by the driving wheels to drive the wheels of the slow speed mechanism.

4. In a ditch digger, a tractor having a rear axle driving rear wheels connected thereto and a rear axle housing, a pair of levers pivotally mounted on the housing having a rearward extension, a slow speed supporting and driving mechanism having a cross shaft mounted on said extension, means to operate said levers to raise the tractor wheels above the ground, gears on the tractor wheels, a pinion in mesh therewith, said pinion being journaled in the said extension of the levers and means to transmit motion from the pinion to the slow speed mechanism.

5. In a ditch digger having a tractor with driving wheels and front steering wheels, a pair of levers pivotally connected to the tractor, the rear ends extending rearwardly of the main portion of the tractor, the front ends of the levers extending forwardly towards the front end, a slow speed supporting and driving mechanism connected to the rear ends of the levers, means to drive said mechanism from the tractor, cables connected to the front of the levers, and means extending rearwardly from the forward end of the tractor to operate said cables to raise and lower the levers and hence to raise and lower the slow speed mechanism and raise the driving wheels.

6. In the art described, the combination of a tractor having a rear axle housing, an axle therein, wheels on the axle, a frame structure pivotally mounted on the axle housing, a supporting and driving slow speed endless track mechanism attached to the frame structure entirely rearward of said housing, means to positively exert a pressure to pivot the frame structure to bring said slow speed mechanism in contact with the ground and to raise the tractor housing and hence the wheels above the ground, and means to drive the wheels and the slow speed mechanism.

7. In the art described, the combination of a tractor having a rear axle housing, an axle therein, wheels on the axle, a frame structure pivotally mounted on the axle housing provided with longitudinally extending levers, the front end extending towards the front of the tractor and the rear extension behind the tractor with a slow speed supporting and driving mechanism connected thereto rearward of said housing, means to operate the levers connected to the front end thereof and to raise the tractor housing and hence the wheels above the ground, and means to drive the wheels and the slow speed mechanism.

8. In the art described, the combination of a tractor having a rear axle housing, an axle therein, wheels on the axle, a plurality of levers pivotally mounted in the housing, a rearward extension of the levers, a supporting and driving slow speed endless track mechanism mounted on the extension rearwardly of the axle housing, the slow speed mechanism being adapted to be brought into contact with the ground and pressure exerted thereon to raise the tractor wheels above the ground, and means to drive the wheels and the slow speed mechanism.

9. In the art described, the combination of a tractor having a rear axle housing, an axle therein, wheels on the axle, a plurality of levers pivotally mounted on said housing, a rearward extension of the levers, a slow supporting and driving speed mechanism attached to said extension, means to operate said levers to raise the wheels and lower the slow speed mechanism and vice versa, and means operable on the rotation of the tractor wheels to drive said slow speed mechanism.

10. In the art described, the combination of a tractor having a rear axle housing, an axle therein, wheels on the axle, a slow speed supporting and driving mechanism, means for attaching same to the rear axle housing, means to raise the wheels and lower the slow speed mechanism by exerting pressure on said mechanism and vice versa, and means to drive said slow speed mechanism from the driving wheels of the tractor, said driving wheels being elevated above the ground.

11. In the art described, a tractor having a rear axle housing with a rear axle therein and driving wheels operated from said axle and having front steering wheels, the combination of a supporting and driving slow speed endless track mechanism, means for raising the rear axle housing with the driving wheels above the ground by exerting a pressure on the said mechanism and engaging the slow speed mechanism with the ground, and means to drive such slow speed mechanism from the driving wheels.

12. In the art described, the combination with a tractor having a rear axle housing with an axle, driving wheels and front steering wheels, of a supporting and driving slow speed endless track mechanism having an endless track type traction device, means for elevating the rear axle housing with the driving wheels above the ground by exerting a pressure on the said mechanism, said endless track device supporting the rear part of the tractor, and means to drive said endless track device from the driving wheels of the tractor.

In testimony whereof I have signed my name to this specification.

JOSEPH B. RUATTI.